(12) United States Patent
Takahashi et al.

(10) Patent No.: US 8,306,221 B2
(45) Date of Patent: Nov. 6, 2012

(54) IMAGE ENCRYPTION APPARATUS AND IMAGE DECRYPTION APPARATUS

(75) Inventors: Jun Takahashi, Kawasaki (JP); Taizo Anan, Kawasaki (JP); Kensuke Kuraki, Kawasaki (JP); Shohei Nakagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 755 days.

(21) Appl. No.: 12/411,606

(22) Filed: Mar. 26, 2009

(65) Prior Publication Data

US 2009/0245513 A1  Oct. 1, 2009

(30) Foreign Application Priority Data

Mar. 31, 2008 (JP) ................................ 2008-093978

(51) Int. Cl.
*G06F 21/00* (2006.01)
(52) U.S. Cl. ........................................... 380/55; 380/54
(58) Field of Classification Search .................. None
See application file for complete search history.

(56) References Cited

U.S. PATENT DOCUMENTS

| | | | |
|---|---|---|---|
| 4,459,611 A | 7/1984 | Arai et al. | |
| 5,208,857 A | 5/1993 | Lebrat | |
| 5,287,203 A | 2/1994 | Namizuka | |
| 5,398,283 A * | 3/1995 | Virga | 380/243 |
| 5,491,563 A | 2/1996 | Pomerantz | |
| 5,887,061 A | 3/1999 | Sato | |
| 6,542,261 B1 * | 4/2003 | McGraw | 358/434 |
| 2005/0091499 A1 | 4/2005 | Forlenza et al. | |
| 2007/0076868 A1 | 4/2007 | Ming | |
| 2008/0013727 A1 | 1/2008 | Uemura | |
| 2008/0123848 A1 * | 5/2008 | Qiu et al. | 380/245 |
| 2008/0168277 A1 | 7/2008 | Forlenza et al. | |
| 2008/0279380 A1 * | 11/2008 | Hayashi | 380/243 |

FOREIGN PATENT DOCUMENTS

| | | |
|---|---|---|
| JP | 08-179689 | 7/1996 |
| JP | 9-504660 | 5/1997 |
| JP | 3609097 | 10/2004 |

OTHER PUBLICATIONS

Extended European Search Report for corresponding European application 09004344.9-2202; dated Aug. 3, 2009.

* cited by examiner

*Primary Examiner* — Jung Kim
*Assistant Examiner* — Robert Leung
(74) *Attorney, Agent, or Firm* — Staas & Halsey LLP

(57) ABSTRACT

In an image encryption apparatus for visually encrypting an input image, an encryption area selector selects an encryption area within an input image including an area to be encrypted. An image converter divides the encryption area into a plurality of blocks. The image converter divides each block of the encryption area into a plurality of sub-blocks. An image converter performs an image conversion including rotation and mirror-reverse in accordance with an encryption key on the image in each sub-block. The image converter scrambles the image on a block-by-block basis in accordance with the encryption key. A pixel value converter converts a pixel value of a minimal area in a block so that a position of the block may be detected.

8 Claims, 15 Drawing Sheets

| ENCRYPTION KEY | BINARY REPRESENTATION |
|---|---|
| 1234 | 10011010010 |
| 2006 | 11111010110 |
| ango | 011000010110111001100111101101111 |
| code | 01100011011011110110010001100101 |

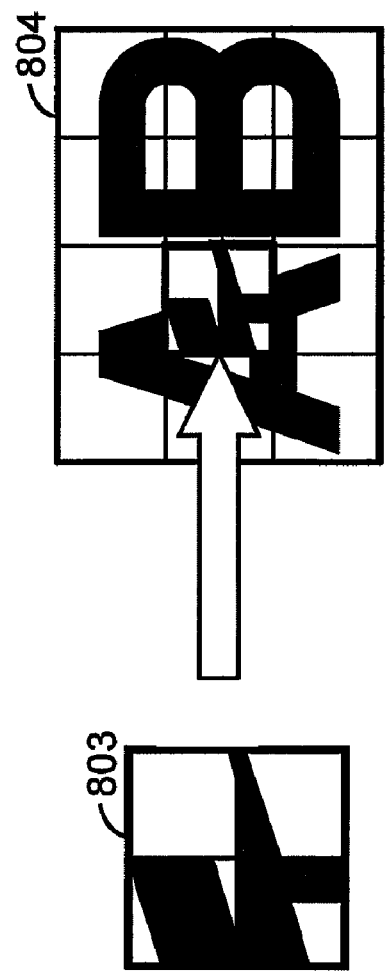
FIG. 8
FIG. 7B
FIG. 7A
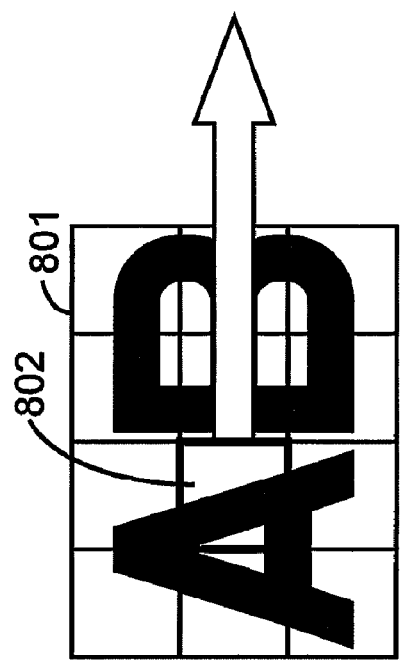

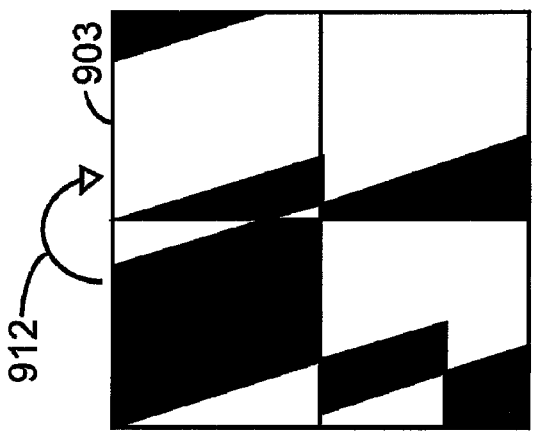
FIG. 9C
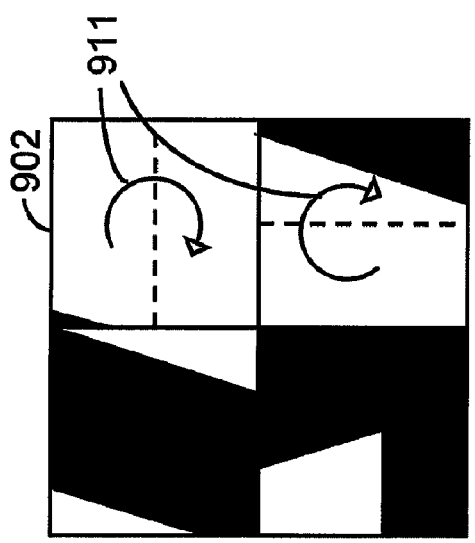
FIG. 9B
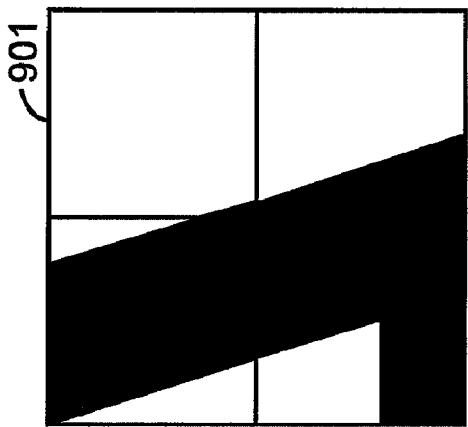
FIG. 9A
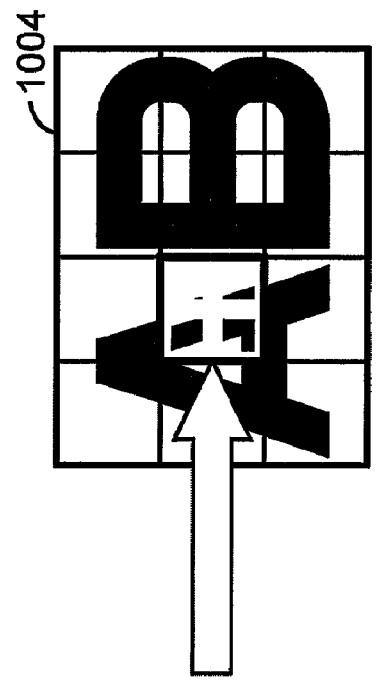
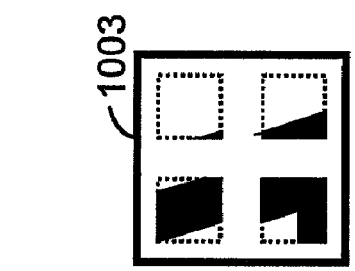
FIG. 10
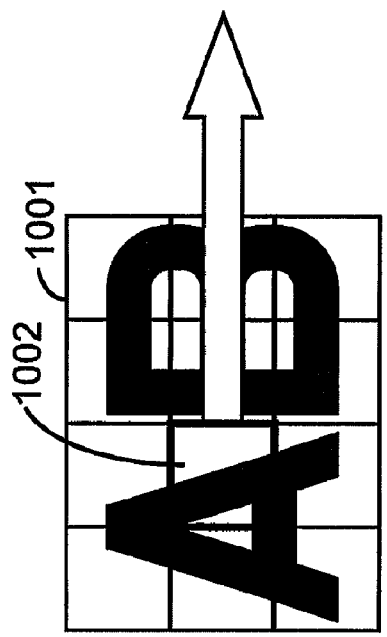

IMAGE ENCRYPTION APPARATUS AND IMAGE DECRYPTION APPARATUS

CROSS-REFERENCE TO RELATED APPLICATIONS

This application is based upon and claims the benefit of priority of the prior Japanese Patent Application No. 2008-093978, filed on Mar. 31, 2008, the entire contents of which are incorporated herein by reference.

FIELD

The embodiments discussed herein are related to an image encryption/decryption apparatus which may prevent information leakage to the third party by visually encrypting a part of an image including an image on a printed matter.

BACKGROUND

Information leakage becomes a serious issue amid the advance of the information society, and a technique of preventing information leakage is expected. For example, as for digital data, a technique of encrypting digital data has been developed to prevent the third party from reading the contents of information even if the information is leaked to the third party. This technique is already utilized as a promising measure for preventing information leakage.

On the other hand, a technique of preventing information leakage of printed matters printed on a paper medium etc. is under development. Thus, the development of a technique capable of preventing information leakage of printed matters as well as the digital data is an urgent expectation.

Specific examples of the print image that expects a measure for preventing information leakage include bills for purchased goods, personal identification numbers such as credit-card numbers or social security numbers, medical charts, school grade reports, and lists of clients. Embodiments of the present invention may be applicable as a technique for countering the information leakage by encrypting an important portion of these images, for example.

To give examples of the Related Art regarding a technique of encrypting and decrypting printed matters, there are a method of dividing a document image into a plurality of blocks and scrambling the blocks (for example, U.S. Pat. No. 4,459,611), a method of scrambling blocks with inversion or mirror-reverse of each block (for example, Japanese Laid-open Patent Publication No. H08-179689), a method of scrambling blocks with a rotation of each block (for example, Japanese Patent No. 3609097), and a method of adding a reference mark for positional detection to an encrypted image and, upon decryption, detecting boundaries between blocks by using the reference mark to process the blocks for at least one of recording, scaling, rotating, shifting, and defect repairing (for example, Published Japanese Translation of a PCT application No. 9-504660).

SUMMARY

According to an aspect of the present invention, provided is an image encryption apparatus for encrypting an input image with an encryption key. The image encryption apparatus includes an encryption area selector, a division separator, a sector separator, an image converter, a scrambler, and a pixel value converter. The encryption area selector selects an encryption area within the input image where the input image is encrypted. The division separator divides the encryption area into a plurality of divisions. Each of the plurality of divisions includes at least one pixel. The sector separator divides each of the plurality of divisions into a plurality of sectors. The image converter performs an image conversion on each of the plurality of sectors. The scrambler scrambles the divisions in accordance with the encryption key. The pixel value converter converts a pixel value of a pixel within each of the plurality of divisions.

According to another aspect of the present invention, provided is an image decryption apparatus for decrypting, with a decryption key, an encrypted image generated from an original image by the image encryption apparatus. The image decryption apparatus includes an encrypted area detector, an encrypted position detector, a pixel value restorer, a de-scrambler, a sector separator, and an image reverse-converter. The encrypted area detector detects an encrypted area within the encrypted image, where the original image has been encrypted. The encrypted position detector detects positions of a plurality of divisions within the encrypted area. The pixel value restorer restores a pixel value of a pixel within each of the plurality of divisions to a value before converted by the image encryption apparatus. The de-scrambler rearranges the plurality of divisions, in accordance with the decryption key, to positions before scrambled by the image encryption apparatus. The sector separator divides each of the plurality of divisions into a plurality of sectors. The image reverse-converter performs a reverse conversion to an image conversion performed by the image encryption apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 7A and 7B are diagrams illustrating an example of a scrambling performed by an image converter of an image encryption apparatus according to an embodiment of the present invention;

FIG. 8 is a diagram illustrating an example of an image conversion in a sub-block performed by an image converter of an image encryption apparatus according to an embodiment of the present invention;

FIGS. 9A, 9B, and 9C are diagrams illustrating examples of image conversions performed by an image converter of an image encryption apparatus according to an embodiment of the present invention;

FIG. 10 is a diagram illustrating an example of an image conversion with an irreversible operation performed by an image converter of an image encryption apparatus according to an embodiment of the present invention;

DESCRIPTION OF EMBODIMENTS

A conventional procedure for encrypting printed matters is as follows:

Step 1: An area (referred to an encryption area) for encryption within an input image is divided into a plurality of divisions (referred to blocks).

Step 2: The input image in the encryption area is scrambled (or rearranged) on a block-by-block basis in accordance with a parameter derived from an input encryption key.

Step 3: A pixel value is converted (for example, inverted) for detection of a position of each block.

A conventional procedure for decrypting encrypted printed matters is as follows:

Step 1: An area (referred to an encrypted area) where an image therein has been encrypted is detected.

Step 2: Blocks in the encrypted area are detected.

Step 3: An image in the encrypted area is de-scrambled on a block-by-block basis in accordance with a parameter derived from an input decryption key.

In particular, at the time of decrypting printed matters, it is preferable to correctly detect the blocks in the encrypted area so that the image may be decrypted even if the image is distorted during printing or scanning.

Figure 21:
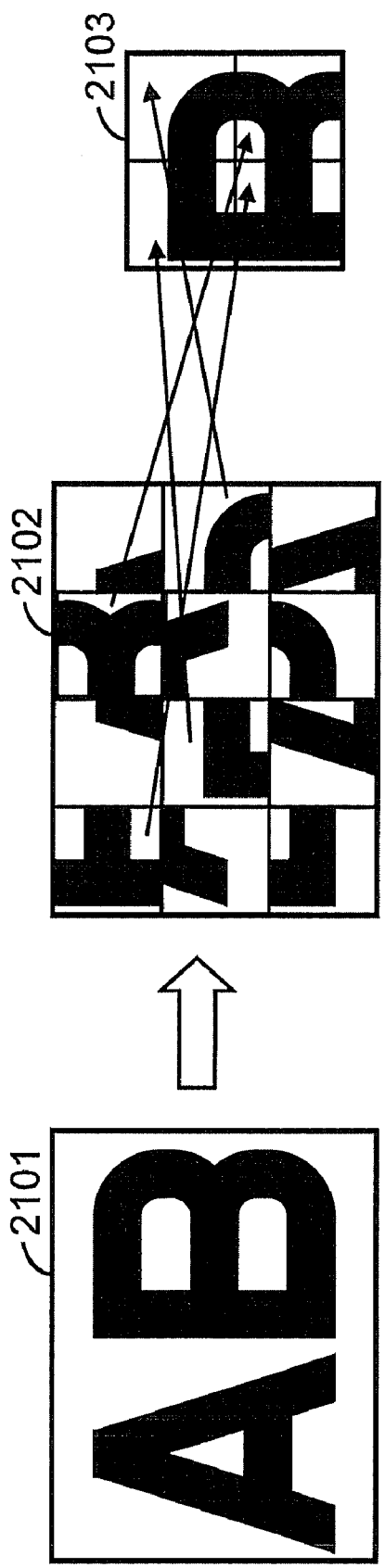
FIG. 21 is a diagram illustrating an example of a process of guessing an original image of scrambled blocks.

If a block size is large, blocks in an encrypted area may be easily detected upon decryption but may allow the third party to guess what is encrypted by matching the blocks together along edges. For example, in FIG. 21, an image 2101 is divided into 12 blocks in total (4 blocks in width direction×3 blocks in height direction) and scrambled on a block-by-block basis to form an encrypted image 2102. In this case, a partial portion 2103 of the original image, for example, may be guessed by matching the blocks together along edges.

Figure 22:
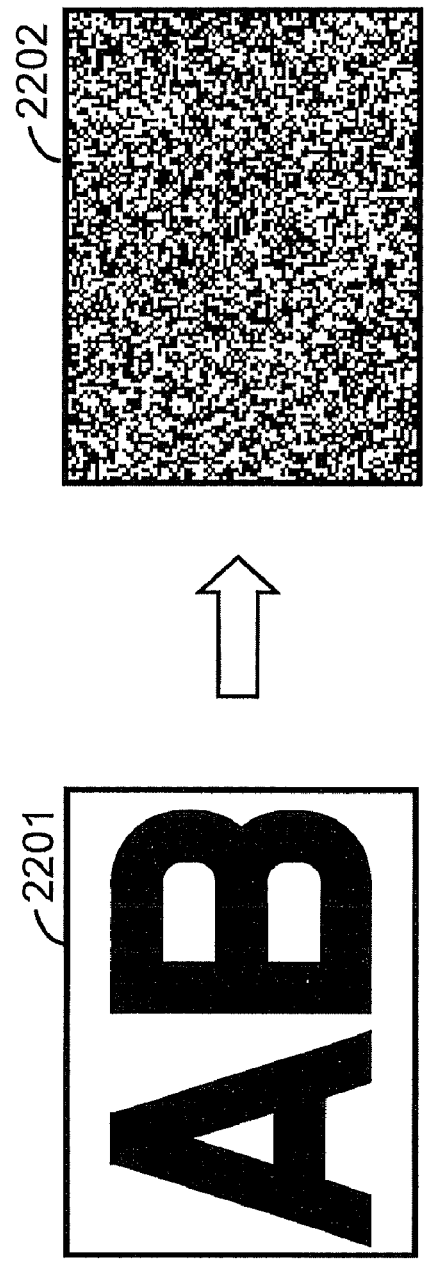
FIG. 22 is a diagram illustrating an example of scrambling an image divided into minimal blocks.

Such a phenomenon could be prevented by reducing a block size. However, too small blocks in printed encrypted image may be hardly detected. In an example illustrated in FIG. 22, an image 2201 is divided into block units of 1×1 pixels and the pixels are scrambled and inverted to form an encrypted image 2202. As for the encrypted image 2202, it is almost impossible to guess what is encrypted by matching the blocks together along edges. Once being printed, however, the image is distorted or blurred. Thus, if the block size is too small, it is very difficult to detect the blocks upon decryption from the technical point of view.

Hereinafter, the embodiments of the present invention will be discussed in detail.

The following discussion is made of a black-and-white image by way of examples. However, the embodiment is not limited thereto but is applicable to a color image as well by processing each of color components, i.e., a red component, a green component, and a blue component, for example.

Figure 1:
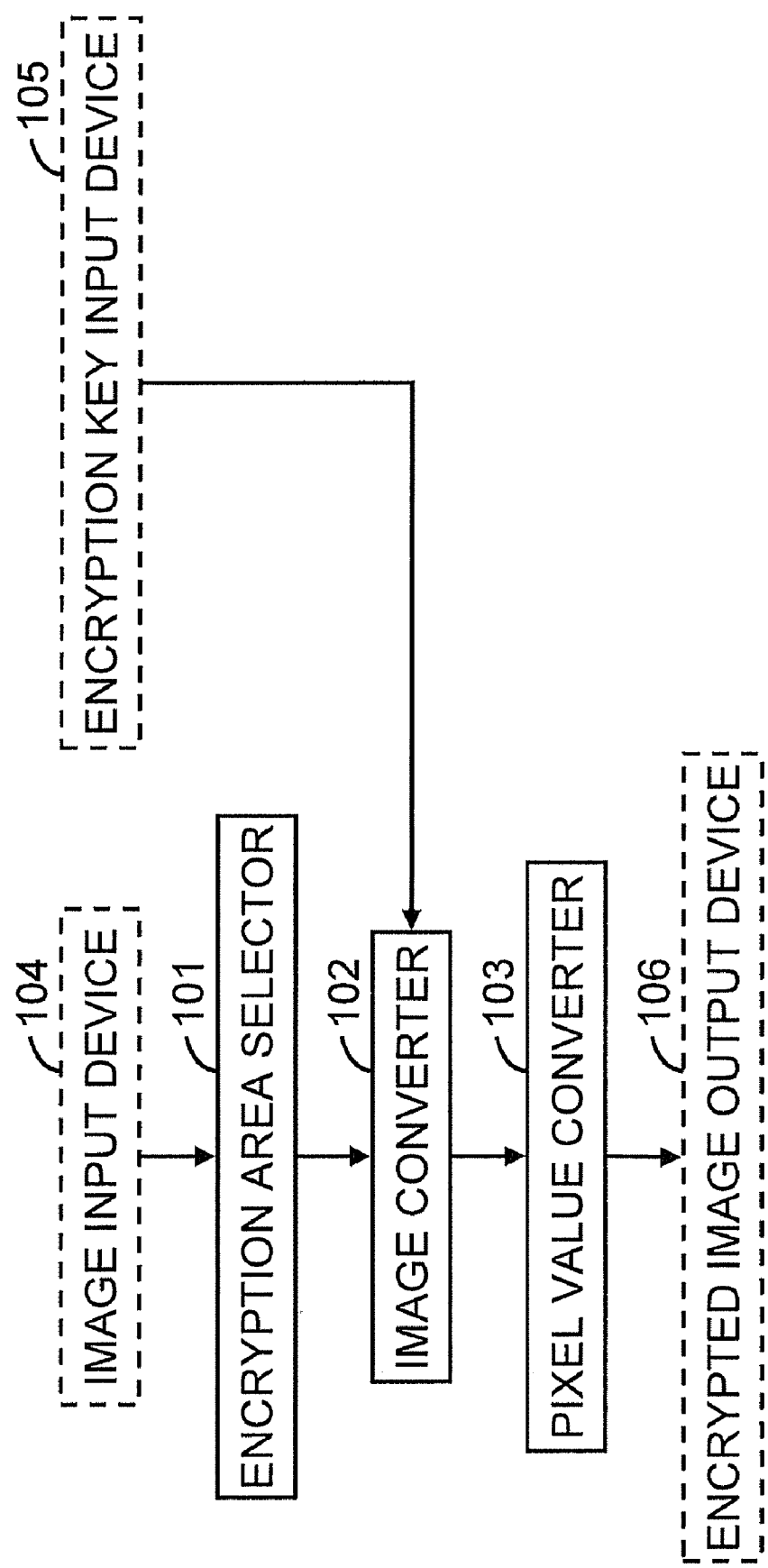
FIG. 1 is a block diagram illustrating a system configuration of an image encryption apparatus according to an embodiment of the present invention.

FIG. 1 is a block diagram illustrating a system configuration of an image encryption apparatus according to an embodiment of the present invention. This configuration may also be implemented by a common computer, which includes a central processing unit (CPU), a main memory, an external storage device, a bus, and the like, and which is connected to appropriate input/output devices, executing a control program stored in the external storage device or the main memory. The image encryption apparatus illustrated in FIG. 1 includes an encryption area selector 101, an image converter 102, and a pixel value converter 103. The image encryption apparatus is connected to an image input device 104, an encryption key input device 105, and an encrypted image output device 106.

The encryption area selector 101 selects an encryption area within an image input via the image input device 104.

Figures 3, 4:
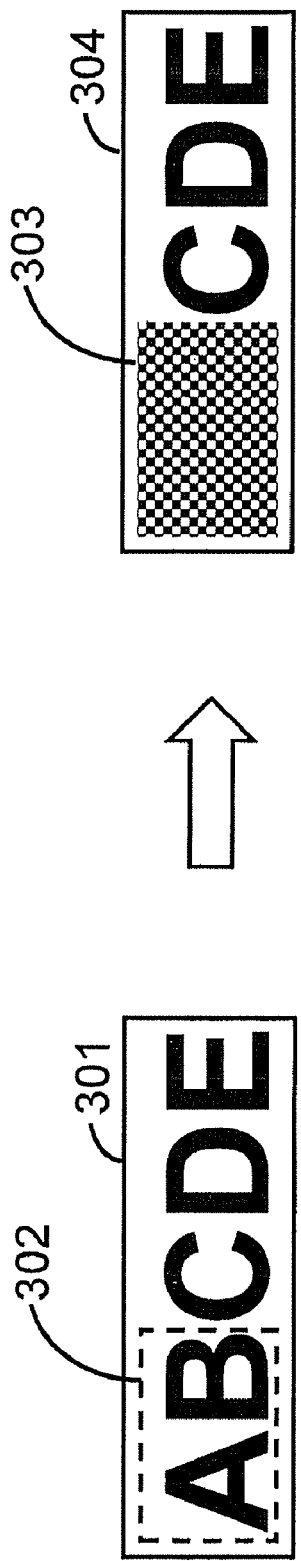
FIG. 3 is a diagram illustrating an example of a process of selecting an encryption area performed by an encryption area selector of an image encryption apparatus according to an embodiment of the present invention.
FIG. 4 is a diagram illustrating examples of an encryption key used in an image encryption apparatus according to an embodiment of the present invention.

FIG. 3 is a diagram illustrating an example of a process of selecting an encryption area performed by an encryption area selector of an image encryption apparatus according to an embodiment of the present invention. As illustrated in FIG. 3, the encryption area selector 101 selects an encryption area 302 within an input image 301 including an area to be encrypted. The input image in the encryption area 302 is converted to a converted image 303 through the following processes of the image converter 102 and the pixel value converter 103, and the input image 301 is converted into an encrypted image 304 including the converted image 303. The encryption area selector 101 may select the encryption area 302 in accordance with coordinates directly specified by a user with an input device such as a mouse or in accordance with coordinates of an encryption area preset in a form of a template, for example.

The image converter 102 visually converts the input image 301 in the encryption area 302 selected by the encryption area selector 101 with an encryption key input via the encryption key input device 105. Here, the encryption key defines, for example, "p" and "q" as two prime numbers in the Expression (1) discussed later.

FIG. 4 is a diagram illustrating examples of an encryption key used in an image encryption apparatus according to an embodiment of the present invention. The encryption key input device 105 accepts a numerical value or a character string (or binary representation of the numerical value or the character string) as an encryption key as illustrated in FIG. 4, for example.

Figure 2:
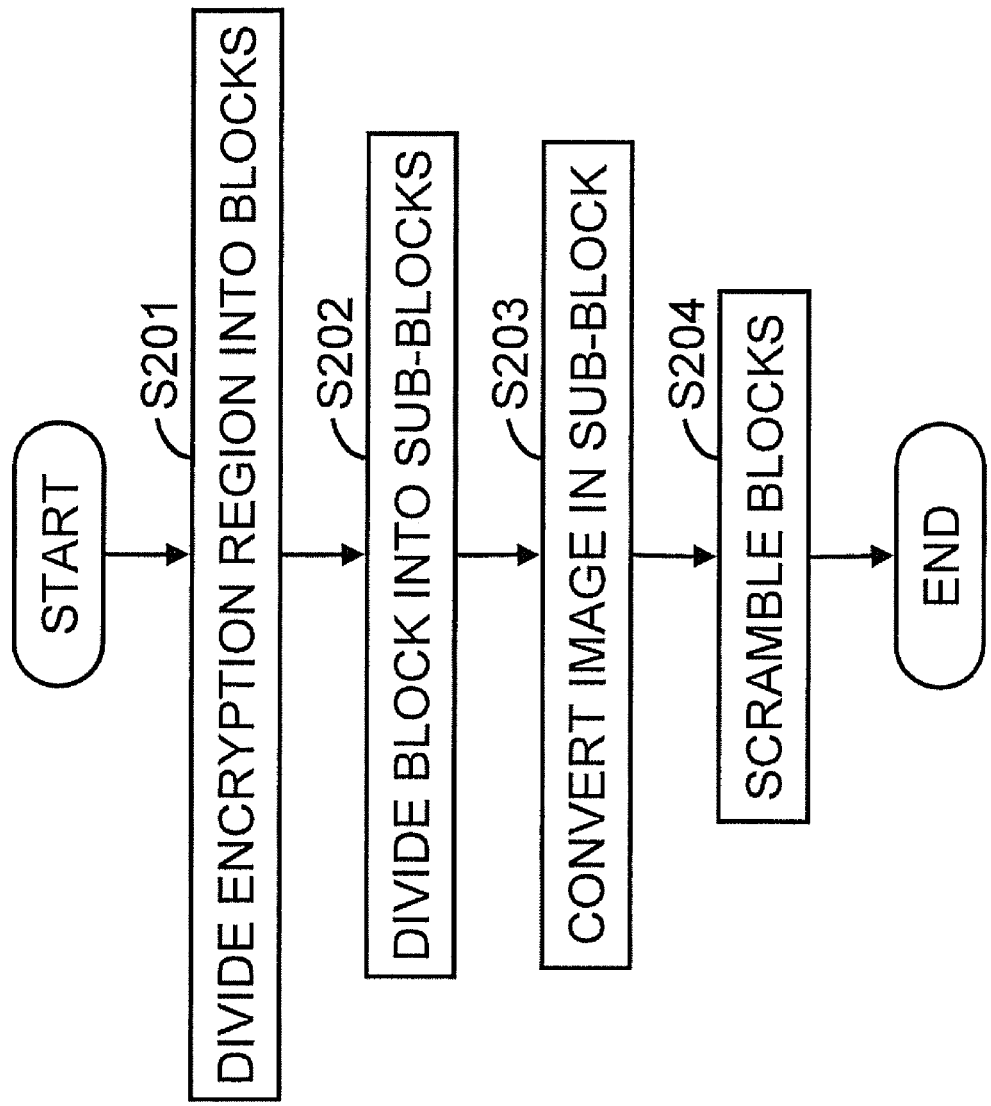
FIG. 2 is a flowchart illustrating an operational flow of a process performed by an image converter of an image encryption apparatus according to an embodiment of the present invention.

FIG. 2 is a flowchart illustrating an operational flow of a process performed by an image converter of an image encryption apparatus according to an embodiment of the present invention.

Figure 5:
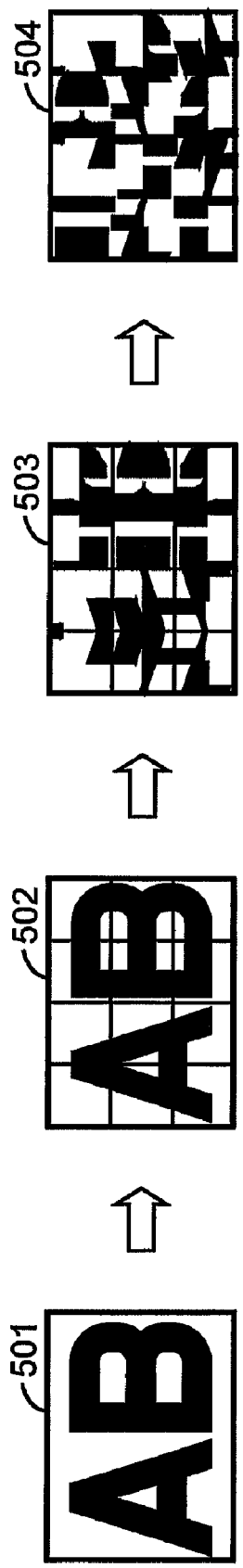
FIG. 5 is a diagram illustrating an example of a process of an image conversion performed by an image converter of an image encryption apparatus according to an embodiment of the present invention.

In Operation S201, the image converter 102 first divides the encryption area 302 into a plurality of blocks. FIG. 5 is a diagram illustrating an example of a process of an image conversion performed by an image converter of an image encryption apparatus according to an embodiment of the present invention. An image 502 illustrated in FIG. 5 is obtained by dividing an original image 501 into blocks. In the image 502, the boundary between the blocks is indicated by the black line so as to easily distinguish each block. In actual process, however, the black line is not drawn.

In Operation S202, the image converter 102 divides each block of the encryption area 302 into a plurality of sectors (referred to sub-blocks).

In Operation S203, the image converter 102 performs an image conversion on the image 502 in each sub-block to produce an image 503.

In Operation S204, the image converter 102 scrambles the image 503 on a block-by-block basis. A specific scrambling procedure is determined in accordance with the encryption key.

In this embodiment, the image conversion in each sub-block is performed prior to the scrambling. However, the image conversion in each sub-block may be performed following the scrambling or may be performed more than one time before and after the scrambling.

Through the above processes, the image converter 102 converts the original image 501 into an encrypted image 504.

Figure 6:
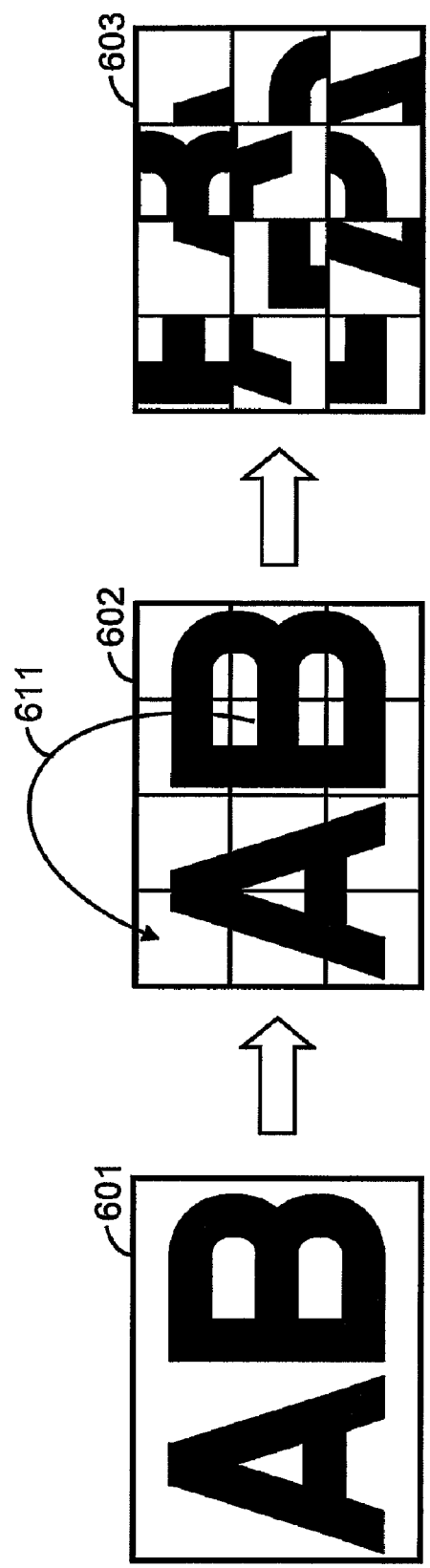
FIG. 6 is a diagram illustrating an example of a process of a scrambling performed by an image converter of an image encryption apparatus according to an embodiment of the present invention.

FIG. 6 is a diagram illustrating an example of a process of a scrambling performed by an image converter of an image encryption apparatus according to an embodiment of the present invention. As illustrated in FIG. 6, the image converter 102 divides an original image 601 into 12 blocks in total (4 blocks in width direction×3 blocks in height direction) to obtain an image 602. The blocks are numbered from 1 to 12 from the upper left block to the lower right block and scrambled. To give a specific example of the scrambling, the image converter 102 generates a block conversion table in accordance with an encryption key. For example, provided that x represents a block number before conversion and y represents a block number after conversion, each block is converted through the scrambling in accordance with Expression (1) below.

$$y = (px) \bmod q, \quad (1)$$

where p and q represent prime numbers.

In Expression (1) above, p and q represent prime numbers defined by the encryption key. For example, if the encryption key defines p and q as follows: p=7 and q=13, x and y take values as illustrated in the block conversion table (Table 1).

TABLE 1

| | x | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| y | 7 | 1 | 8 | 2 | 9 | 3 | 10 | 4 | 11 | 5 | 12 | 6 |

For example, y=7 when x=1. Thus, a block numbered 7 is moved to a position of a block numbered 1 as illustrated with arrow 611 in FIG. 6. FIGS. 7A and 7B are diagrams illustrating an example of a scrambling performed by an image converter of an image encryption apparatus according to an embodiment of the present invention. FIG. 7A illustrates block positions before the scrambling, and FIG. 7B illustrates block positions after the scrambling. All blocks of the image 602 are scrambled to thereby obtain an image 603.

Next, the image conversion in a sub-block will be discussed. FIG. 8 is a diagram illustrating an example of an image conversion in a sub-block performed by an image converter of an image encryption apparatus according to an embodiment of the present invention. First, the image converter 102 divides an original image 801 into a plurality of blocks and further divides each block into a plurality of sub-blocks. In the example illustrated in FIG. 8, a block 802 is taken for instance. The image converter 102 divides the block 802 into 4 sub-blocks in total (2 sub-blocks in width direction and 2 sub-blocks in height direction). The image converter 102 rotates each sub-block to convert the block 802 into a block 803. Thus, a converted image 804 is obtained. The image converter 102 performs this process for all blocks and then scrambles the blocks. The process in sub-block may make it more difficult to guess adjacent blocks by matching the blocks together along edges, than a conventional method with scrambling blocks alone. Thus, a security level is increased.

The image converter 102 may perform various image conversions including a rotation, a mirroring, and a reversible logical operation, on each sub-block in accordance with the encryption key. FIGS. 9A, 9B, and 9C are diagrams illustrating examples of image conversions performed by an image converter of an image encryption apparatus according to an embodiment of the present invention. For example, the image converter 102 may obtain a block 902 illustrated in FIG. 9B by dividing a block 901 illustrated in FIG. 9A into sub-blocks and vertically or horizontally inverting (mirroring) each sub-block. Arrows 911 illustrated in FIG. 9B denote operations of mirroring. Alternatively, the image converter 102 may obtain a block 903 illustrated in FIG. 9C through exclusive OR operation between the adjacent sub-blocks. Arrows 912 illustrated in FIG. 9C denote operations of exclusive OR. Needless to say, the above processes may be performed in combination for each sub-block.

The image conversion may be irreversible one. FIG. 10 is a diagram illustrating an example of an image conversion with an irreversible operation performed by an image converter of an image encryption apparatus according to an embodiment of the present invention. For example, the image converter 102 divides an original image 1001 into a plurality of blocks and extracts a block 1002. Then, the image converter 102 scales down each sub-block in the block 1002 to obtain a block 1003. Thus, a converted image 1004 is obtained. When irreversible operation is performed, the original image may not be perfectly decrypted. By switching reversible/irreversible operations, the encrypted image may be formed for various purposes such as the case of keeping bit-level exactness or the case of enhancing a security level.

Figure 11:
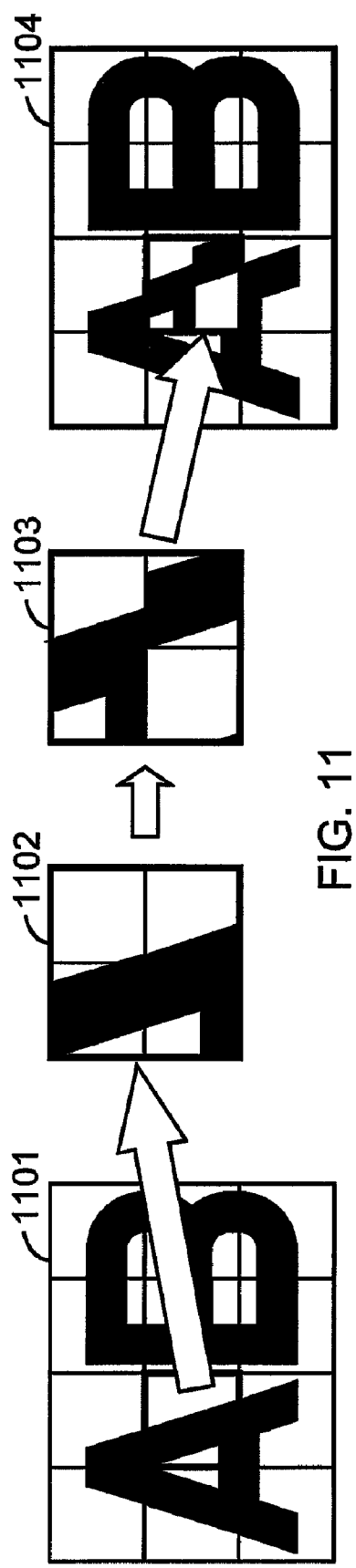
FIG. 11 is a diagram illustrating an example of scrambling sub-blocks performed by an image converter of an image encryption apparatus according to an embodiment of the present invention.

According to another embodiment of the present invention, the image converter 102 (see FIG. 1) may divide each block into a plurality of sub-blocks to scramble each of the plurality of sub-blocks. FIG. 11 is a diagram illustrating an example of scrambling sub-blocks performed by an image converter of an image encryption apparatus according to an embodiment of the present invention. In the example illustrated in FIG. 11, the image converter 102 extracts a block 1102 from an image 1101 divided into blocks and divides the block 1102 into a plurality of sub-blocks. Then, the image converter 102 scrambles sub-blocks to obtain a block 1103. Thus, a converted image 1104 is obtained. Scrambling the sub-blocks makes it very difficult to guess what is encrypted by matching the blocks together along edges because edges of blocks have been destroyed. Needless to say, the sub-block may be subjected to both the scrambling and the image conversion.

Figure 12:
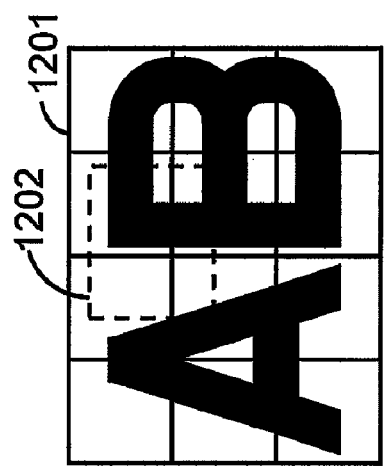
FIG. 12 is a diagram illustrating an example of obtaining sub-blocks independently of blocks performed by an image converter of an image encryption apparatus according to an embodiment of the present invention.

In the examples illustrated in FIGS. 8 to 11 and FIG. 2, the image converter 102 divides a block into sub-blocks. Sub-blocks, however, may be formed independently of the blocks. FIG. 12 is a diagram illustrating an example of obtaining sub-blocks independently of blocks performed by an image converter of an image encryption apparatus according to an embodiment of the present invention. As illustrated in FIG. 12, an arbitrary area 1202 within an image 1201 divided into blocks may be divided into sub-blocks. Here, the sub-block is preferably smaller than the block.

Needless to say, the image converter 102 may perform the division of a block into sub-blocks as illustrated in FIGS. 8 to 11 and the division of an area other than a block into sub-blocks as illustrated in FIG. 12 in combination. For example, the image converter 102 may divide a block into sub-blocks in a first step and divide an area other than the block into sub-blocks in a second step, and then scramble the sub-blocks. Further, the image converter 102 may perform the image conversion and the scrambling on sub-blocks more than one time with varying sizes of the sub-blocks. Here, processes on sub-blocks in the time of encryption must correspond to processes on sub-blocks in the time of decryption discussed later, by setting a parameter or the like in advance, for example.

Figure 13:
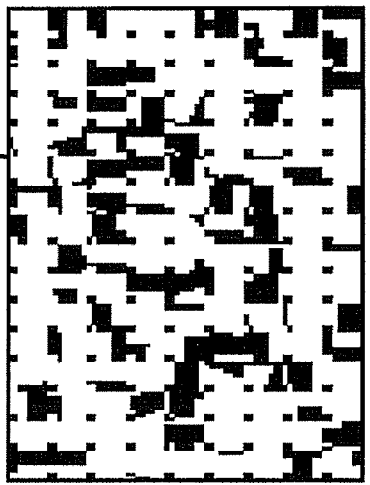
FIG. 13 is a diagram illustrating an example of pixel value conversion performed by a pixel value converter of an image encryption apparatus according to an embodiment of the present invention.
Figure 13:
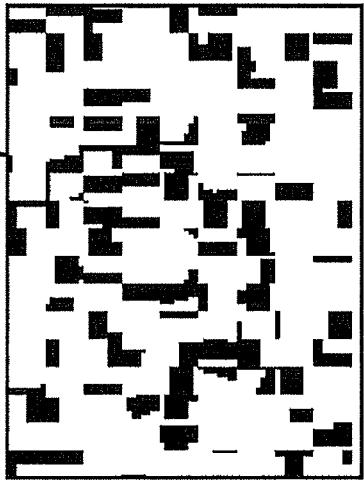

Next, the pixel value converter 103 illustrated in FIG. 1 will be discussed. In the embodiments, the image conversion and the scrambling are performed on a sub-block smaller than a block. However, it is difficult to detect a small block in a printed encrypted image from the technical point of view. Therefore, a pixel value in all or some of the blocks is preferably converted so that a position of the block may be detected. To be specific, a minimal area in a block is subjected to pixel value conversion at a constant interval in a vertical direction and in a horizontal direction. FIG. 13 is a diagram illustrating an example of pixel value conversion performed by a pixel value converter of an image encryption apparatus according to an embodiment of the present invention. The pixel value converter 103 converts a pixel value of a minimal area in a block of a converted image 1301 obtained by the image converter 102 to generate a final encrypted image 1302. Hereinafter, the minimal area in the block, which has been subjected to pixel value conversion, is referred to as "boundary marker".

By performing the pixel value conversion in the time of encryption, the boundary marker may be detected when the encrypted image is printed and decrypted. Thus, an exact position of a block in the encrypted area may be detected. Further, a range of pixel value conversion is limited to the minimal area to thereby suppress bleeding of ink in black pixels upon printing and obtain a clear decrypted image. The image conversion is performed on each sub-block which is smaller than a block but positional detection is performed on a block-by-block basis. Hence, an accuracy of block position detection is equivalent to that of a conventional method.

Through the above processes, the final encrypted image obtained by encrypting the original image in the encryption area selected by the encryption area selector 101 is output from an encrypted image output device 106 illustrated in FIG. 1. The final encrypted image may be printed out via a printer or saved as it is in the form of electronic data. Further, in the case of encrypting any other area in the final encrypted image, the final encrypted image may be input via the image input device 104 and subjected to the above encryption process again.

Figure 14B:
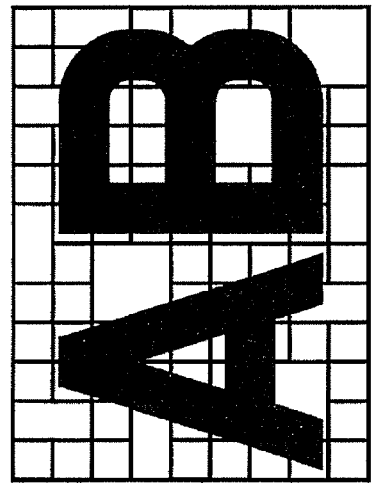
FIGS. 14A and 14B are diagrams illustrating examples of blocks employed in an image encryption apparatus according to an embodiment of the present invention.
Figure 14A:
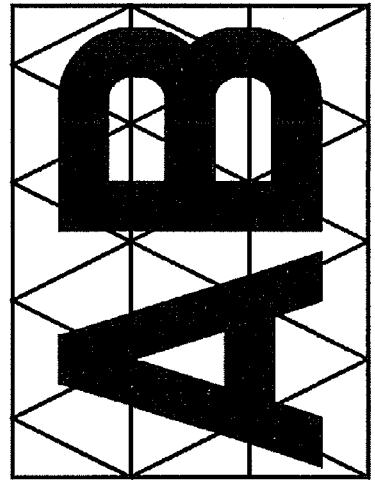

In the discussion of the above encryption process, each block has a rectangular shape. However, the block in the embodiments is not limited to the rectangular shape. The block may have any other shape as long as a size of the encryption area is not changed throughout the scrambling. FIGS. 14A and 14B are diagrams illustrating examples of blocks employed in an image encryption apparatus according to an embodiment of the present invention. As illustrated in FIG. 14A, a block may have a triangular shape. Further, blocks different in shape or size may be mixed as illustrated in FIG. 14B.

Figure 15:
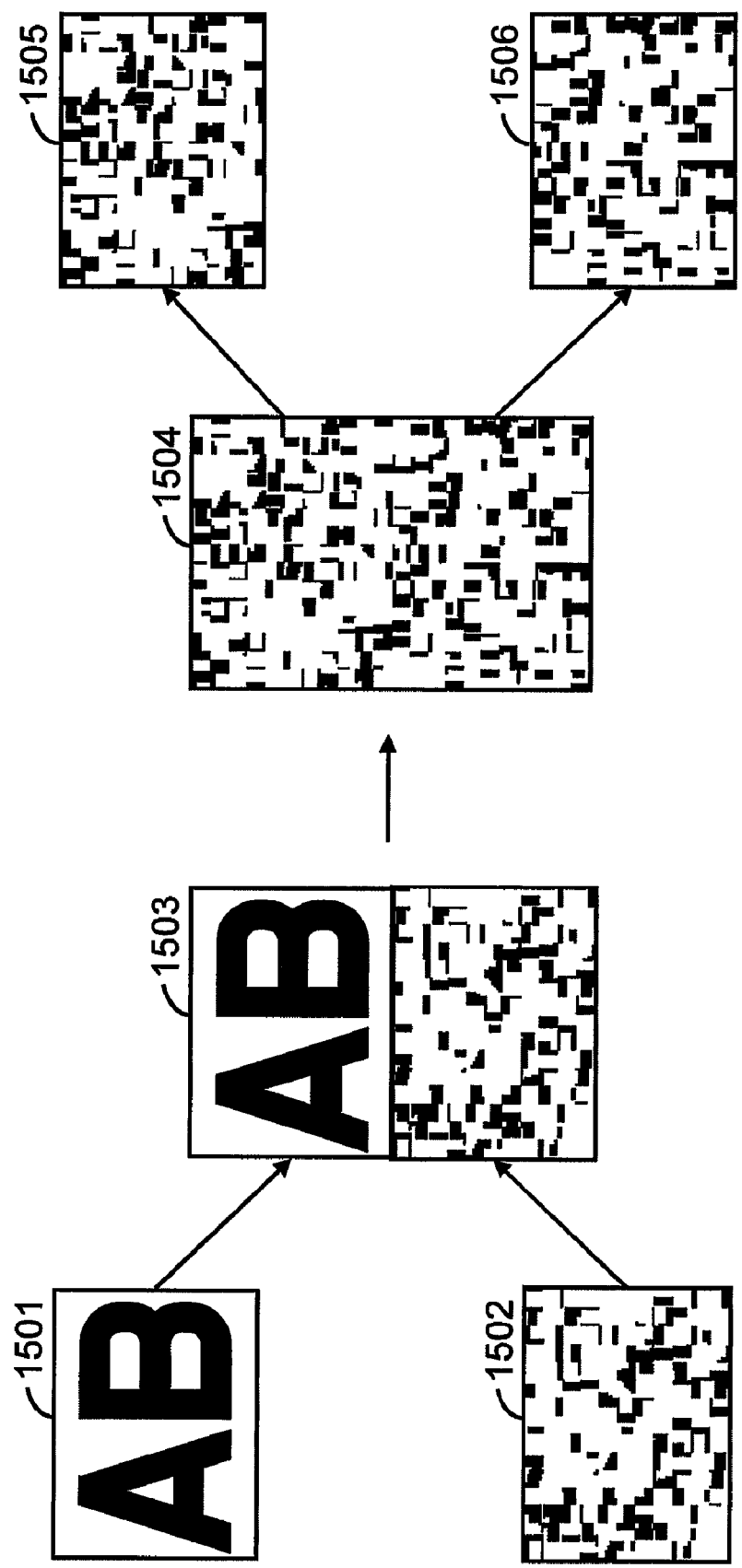
FIG. 15 is a diagram illustrating an example of a scrambling over a plurality of encryption areas performed by a pixel value converter of an image encryption apparatus according to an embodiment of the present invention.

According to another embodiment of the present invention, upon scrambling by the image converter 102, blocks in an encryption area and blocks in an encrypted area may be scrambled together in accordance with an encryption key. FIG. 15 is a diagram illustrating an example of a scrambling over a plurality of encryption areas performed by a pixel value converter of an image encryption apparatus according to an embodiment of the present invention. An encryption area 1501 selected by the encryption area selector 101 and an encrypted area 1502 are combined into one encryption area 1503 to scramble blocks in the encryption area 1503 to thereby form an encrypted image 1504. The encrypted image 1504 is divided into encrypted images 1505 and 1506, which are used as new encrypted areas. The scrambling over a plurality of encryption areas in this way makes it impossible to reconstruct the original information on the basis of information of one encrypted area.

Two or more encryption areas may be combined, or encryption areas in either the same image or different images may be combined. In the example illustrated in FIG. 15, an encryption area and an encrypted area are combined, but needless to say, encryption areas or encrypted areas may also be combined.

The image input device 104 and the encryption area selector 101 may preferably select a plurality of areas at the time of performing the above processes.

Next, a decryption process will be discussed.

Figure 16:
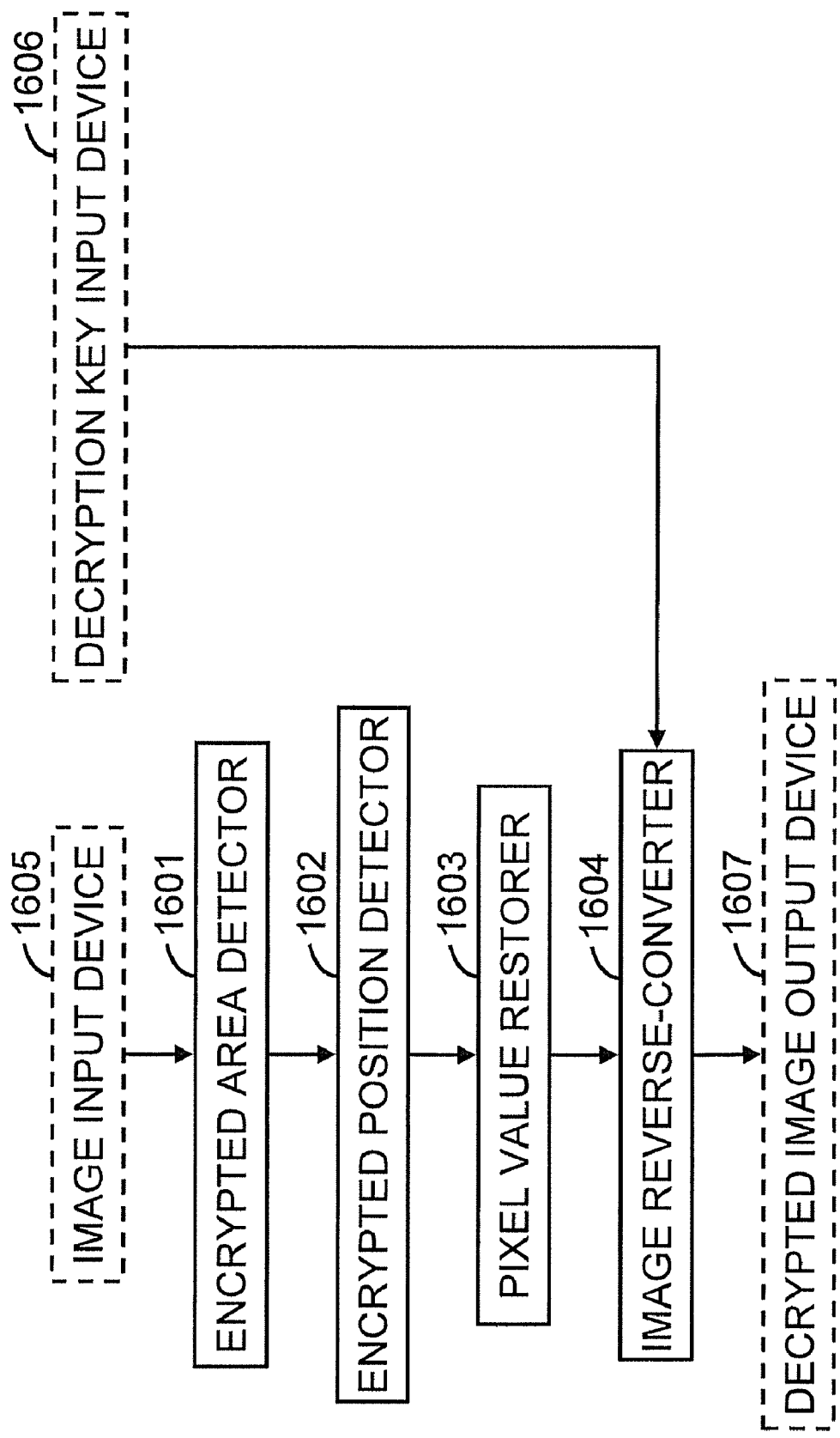
FIG. 16 is a block diagram illustrating a system configuration of an image decryption apparatus according to an embodiment of the present invention.

FIG. 16 is a block diagram illustrating a system configuration of an image decryption apparatus according to an embodiment of the present invention. Similar to the image encryption apparatus, this configuration may also be implemented by a common computer, which includes a central processing unit (CPU), a main memory, an external storage device, a bus, and the like, and which is connected to appropriate input/output devices, executing a control program stored in the external storage device or the main memory. The image decryption apparatus illustrated in FIG. 16 includes an encrypted area detector 1601, an encrypted position detector 1602, a pixel value restorer 1603, and an image reverse-converter 1604. The image decryption apparatus is connected to an image input device 1605, a decryption key input device 1606, and a decrypted image output device 1607.

The encrypted area detector 1601 detects an encrypted area on an encrypted image input via the image input device 1605.

Figure 18:
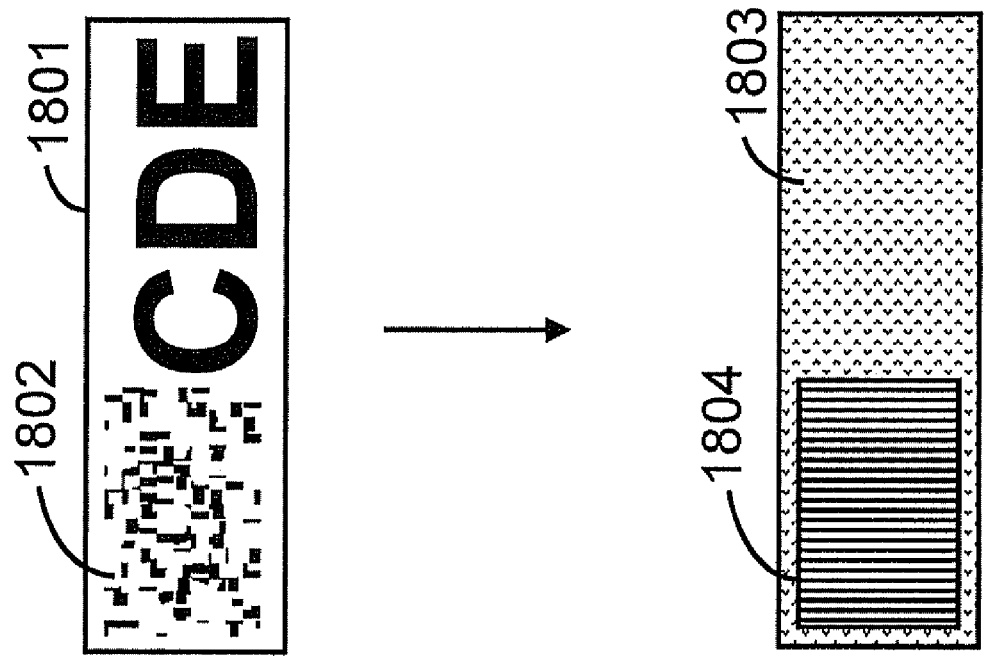
FIG. 18 is a diagram illustrating an example of detecting an encrypted area performed by an encrypted area detector of an image decryption apparatus according to an embodiment of the present invention.

The encryption area may be detected through image processing. FIG. 18 is a diagram illustrating an example of detecting an encrypted area performed by an encrypted area detector of an image decryption apparatus according to an embodiment of the present invention. As illustrated in FIG. 18, a boundary marker of an encrypted area 1802 within an encrypted image 1801 is in a block. Thus, when the encrypted image 1801 is subjected to frequency analysis, a frequency tends to become higher in a portion 1804 corresponding to the interval of the boundary markers in the encrypted area 1802, and the encrypted area 1802 may be detected by distinguishing the portion 1804 from an area 1803 of lower periodicity.

Alternatively, the encrypted area may be directly specified by a user with an input device such as a mouse or may be detected by using information about the encrypted area, which is preset in a form of a template, for example.

Figure 19C:
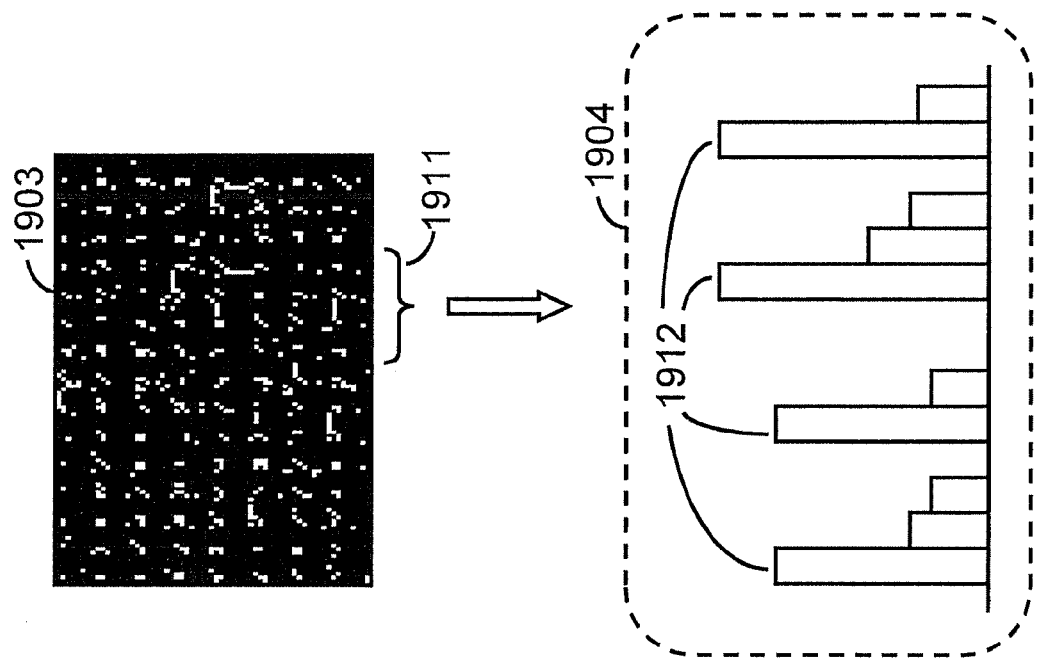
FIGS. 19A, 19B, and 19C are diagrams illustrating an example of detecting a position of each block performed by an encrypted position detector of an image decryption apparatus according to an embodiment of the present invention.
Figure 19A:
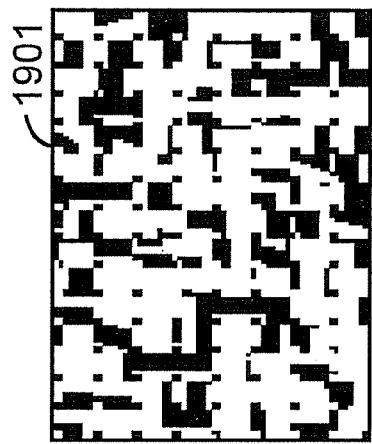
Figure 19B:
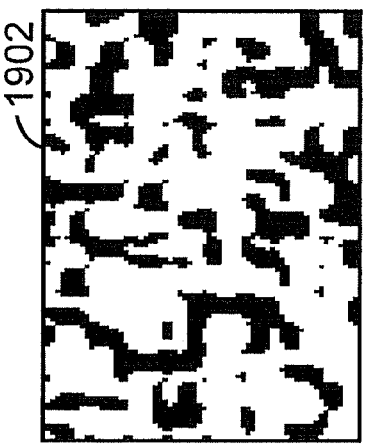

Next, the encrypted position detector 1602 illustrated in FIG. 16 detects an exact position of each of blocks in the encrypted area detected by the encrypted area detector 1601. FIGS. 19A, 19B, and 19C are diagrams illustrating an example of detecting a position of each block performed by an encrypted position detector of an image decryption apparatus according to an embodiment of the present invention. The encrypted position detector 1602 applies a median filter (filter outputting the median pixel value of a pixel and surrounding pixels thereof) to an encrypted image 1901 illustrated in FIG. 19A detected by the encrypted area detector 1601 to obtain a filtered image 1902 illustrated in FIG. 19B. The encrypted position detector 1602 then calculates difference between the encrypted image 1901 and the filtered image 1902 to obtain a differential image 1903 illustrated in FIG. 19C. The boundary markers are so small that the median filtering removes the boundary markers. Accordingly, the boundary markers removed by the median filtering appear in the differential image 1903 between the encrypted image 1901 and the filtered image 1902. The boundary markers appear at a constant interval. Thus, the encrypted position detector 1602 may detect, in a histogram 1904 of column elements 1911 of the differential image 1903, portions 1912 of higher value that appear at a constant interval, more specifically, the lateral coordinates of the boundary markers. Likewise, a histogram of row elements of the differential image 1903 gives the vertical coordinates of the boundary markers. The encrypted position detector 1602 detects the boundary markers in this way to thereby detect an exact position of each block.

The pixel value restorer 1603 illustrated in FIG. 16 restores a converted pixel value in a block into the original pixel value. For example, if the pixel value has been converted through pixel value inversion, the pixel value restorer 1603 may inverse the pixel value again for restoration. If the boundary marker is in a minimal area, the pixel value restorer 1603 may restore the image through an image interpolation. The pixel value restorer 1603 may perform the image interpolation by using an average value weighted with a distance from a target area, as expressed by Expression (2) below.

$$\text{(Estimated value of } P) = \sum_{i=0}^{k-1} (\text{pixel value of } n_i / r_i) \Big/ \sum_{i=0}^{k-1} (1/r_i)$$

where $n_i$ (i=0, 1, ..., k−1) represents pixels surrounding a minimal area P, and $r_i$ (i=0, 1, ..., k−1) represents a distance between P and $n_i$.

Figure 20:
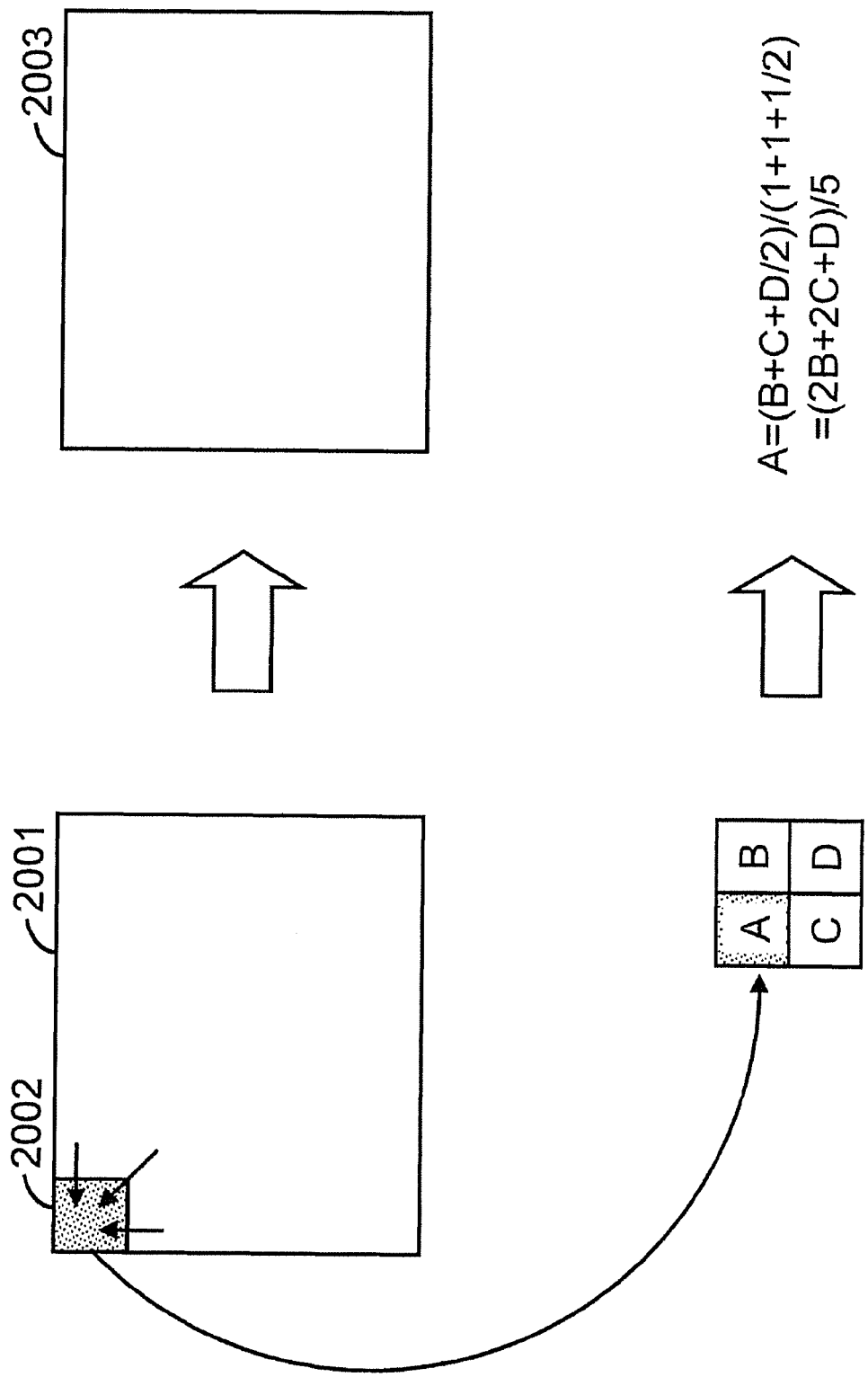
FIG. 20 is a diagram illustrating an example of an image interpolation performed by a pixel value restorer of an image decryption apparatus according to an embodiment of the present invention.

FIG. 20 is a diagram illustrating an example of an image interpolation performed by a pixel value restorer of an image decryption apparatus according to an embodiment of the present invention. As illustrated in FIG. 20, if a pixel value of a boundary marker 2002 of a block 2001 and pixel values of surrounding pixels are represented by a pixel A, a pixel B, a pixel C, and a pixel D, and a distance between the pixels A and B and a distance between the pixels A and C are 1, and a distance between the pixels A and D is 2, the pixel value restorer 1603 may restore a pixel value of the pixel A by interpolation such that A=(2B+2C+D)/5 to obtain a restored block 2003. In the case of decrypting an image obtained by printing and scanning an encrypted image, it is difficult to completely restore the pixel value to the original pixel value through pixel value inversion, so the image interpolation is an effective technique.

Figure 17:
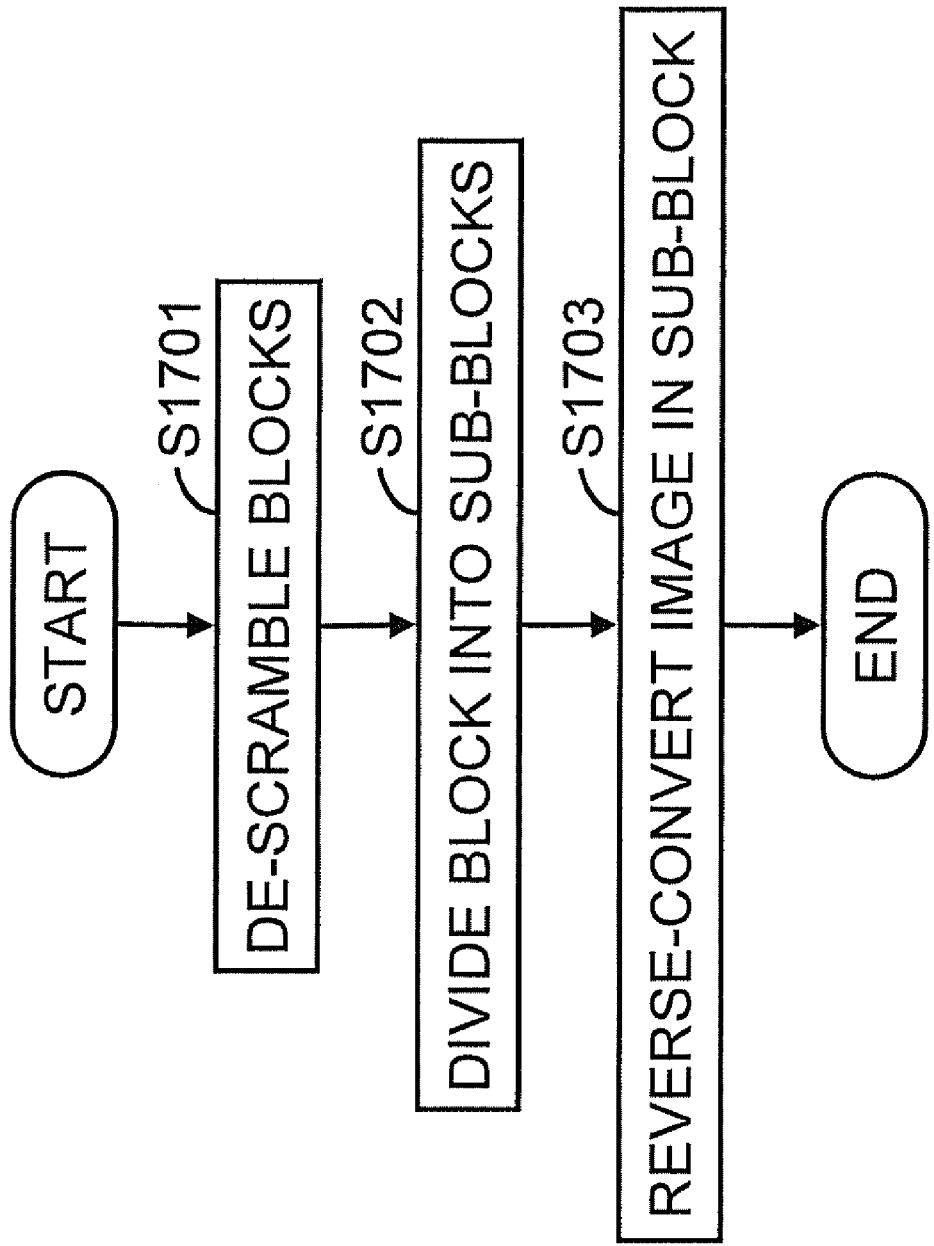
FIG. 17 is a flowchart illustrating an operational flow of a process performed by an image reverse-converter of an image decryption apparatus according to an embodiment of the present invention.

The image reverse-converter 1604 illustrated in FIG. 16 decrypts an encrypted image with a decryption key input via the decryption key input device 1606. FIG. 17 is a flowchart illustrating an operational flow of a process performed by an image reverse-converter of an image decryption apparatus according to an embodiment of the present invention.

In Operation S1701, the image reverse-converter 1604 de-scrambles the blocks detected by the encrypted position detector 1602 to corresponding positions of the blocks in the original image before the scrambling in accordance with a decryption key.

In Operation S1702, the image reverse-converter 1604 divides each block into sub-blocks.

In Operation S1703, the image reverse-converter 1604 performs reverse-conversion on each sub-block.

Through the above processes, a decrypted image is obtained.

In the process illustrated in FIG. 17, sub-blocks are obtained by dividing each block but may be obtained independently of each block as in the encryption process. Here, as discussed above, processes on sub-blocks in the time of encryption must correspond to processes on sub-blocks in the time of decryption, by setting a parameter or the like in advance, for example.

To discuss an example of de-scrambling, the same example cited in the discussion about the image converter 102 is employed. That is, the encrypted position detector 1602 detects 12 blocks in total (4 blocks in width direction×3 blocks in height direction) and y=7 when x=1 as illustrated in FIGS. 7A and 7B. Thus, the image reverse-converter 1604 determines that a block numbered 1 in the encrypted image corresponds to a position of a block numbered 7, and rearranges the block.

The method for de-scrambling the blocks by the image reverse-converter 1604 is uniquely determined in accordance with the decryption key. Therefore, only when a correct decryption key is input via the decryption key input device 1606, the image reverse-converter 1604 may appropriately de-scramble blocks in the encrypted image and information that was hidden by encryption may be restored.

The image conversion method and the scrambling method for sub-blocks are also uniquely determined in accordance with the decryption key. For example, a sub-block is mirror-reversed or rotated in a reverse direction to that in the encryption. Therefore, only when a correct decryption key is input via the decryption key input device 1606, information may be correctly restored.

A decrypted image output device 1607 illustrated in FIG. 16 outputs a decrypted image generated by the pixel value restorer 1603 and the image reverse-converter 1604.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image encryption apparatus to encrypt an input image with an encryption key, the image encryption apparatus comprising:
   an encryption area selector to select an encryption area within the input image where the input image is to be encrypted;
   a division separator to divide the encryption area into a plurality of divisions, each of the plurality of divisions including at least one pixel;
   a sector separator to divide each of the plurality of divisions into a plurality of sectors;
   an image converter to perform an image conversion on each of the plurality of sectors;
   a scrambler to scramble the divisions in accordance with the encryption key; and
   a pixel value converter to convert a pixel value of only a pixel within a boundary marker of each of the plurality of divisions to indicate a boundary of each of the plurality of divisions, each boundary marker being selected as a minimum area of one or more adjacent pixels located at a predetermined position within a sector located at a predetermined position within each of the plurality of divisions.

2. The image encryption apparatus of claim 1, wherein the image converter performs, as the image conversion, one or more conversions from among conversions including a rotation, a mirroring, a reversible conversion, and an irreversible conversion, one or more times in accordance with the encryption key.

3. The image encryption apparatus of claim 1, wherein the image converter scrambles sections one or more times in accordance with the encryption key.

4. The image encryption apparatus of claim 1, wherein the image converter performs one or more conversions from among conversions including a rotation, a mirroring, a reversible conversion, and an irreversible conversion, one or more times in accordance with the encryption key, and scrambles sections one or more times in accordance with the encryption key.

5. The image encryption apparatus of claim 1, wherein the scrambler scrambles divisions in a combined area generated by combining the divisions within the encryption area and an encrypted area divided into other divisions, the encrypted area having been subjected to an encryption.

6. An image decryption apparatus to decrypt, with a decryption key, an encrypted image generated from an original image by the image encryption apparatus of claim 1, the image decryption apparatus comprising:
   an encrypted area detector for detecting an encrypted area within the encrypted image, where the original image has been encrypted;
   an encrypted position detector to detect positions of a plurality of divisions within the encrypted area on a basis of a pixel value of only a pixel within a boundary marker of each of the plurality of divisions, each boundary marker being selected as a minimum area of one or more adjacent pixels located at a predetermined position within a sector located at a predetermined position within each of the plurality of divisions;
   a pixel value restorer to restore the pixel value of the pixel within the boundary marker of each of the plurality of divisions to a value before conversion by the image encryption apparatus;
   a de-scrambler to rearrange the plurality of divisions, in accordance with the decryption key, to positions before being scrambled by the image encryption apparatus;
   a sector separator to divide each of the plurality of divisions into a plurality of sectors; and
   an image reverse-converter to perform a reverse conversion to an image conversion performed by the image encryption apparatus.

7. An image encryption method to encrypt an input image with an encryption key, the image encryption method comprising:
   selecting an encryption area within the input image where the input image is to be encrypted;
   dividing the encryption area into a plurality of divisions, each of the plurality of divisions including at least one pixel;
   dividing each of the plurality of divisions into a plurality of sectors;
   performing an image conversion on each of the plurality of sectors;
   scrambling the divisions in accordance with the encryption key; and
   converting, by a processor, a pixel value of only a pixel within a boundary marker of each of the plurality of divisions to indicate a boundary of each of the plurality of divisions, each boundary marker being selected as a minimum area of one or more adjacent pixels located at a predetermined position within a sector located at a predetermined position within each of the plurality of divisions.

8. An image decryption method to decrypt, with a decryption key, an encrypted image, the image decryption method comprising:
   detecting an encrypted area within the encrypted image, where the original image has been encrypted;
   detecting, by a processor, positions of a plurality of divisions within the encrypted area on a basis of a pixel value of only a pixel within a boundary marker of each of the plurality of divisions, each boundary marker being selected as a minimum area of one or more adjacent pixels located at a predetermined position within a sector located at a predetermined position within each of the plurality of divisions;
   restoring the pixel value of the pixel within the boundary marker of each of the plurality of divisions to a value before conversion by the image encryption apparatus;

rearranging the plurality of divisions, in accordance with the decryption key, to positions before being scrambled by the image encryption apparatus;
dividing each of the plurality of divisions into a plurality of sectors; and performing a reverse conversion to an image conversion performed in the image encryption method.

* * * * *